O. B. BLANKENSHIP & H. B. SHERWOOD.
DASH POT.
APPLICATION FILED AUG. 3, 1908.
920,251.
Patented May 4, 1909.
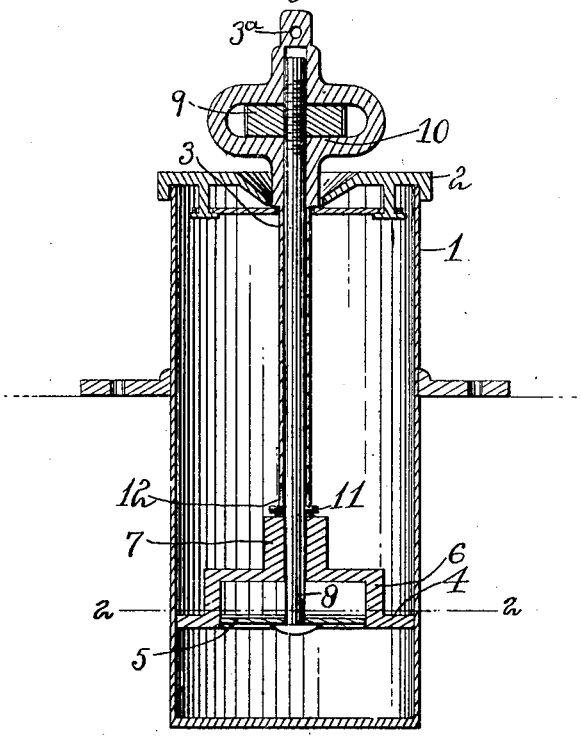
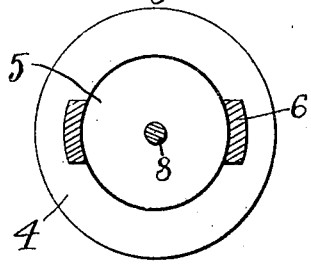

UNITED STATES PATENT OFFICE.

ORAN B. BLANKENSHIP AND HARRY B. SHERWOOD, OF KANSAS CITY, MISSOURI.

DASH-POT.

No. 920,251. Specification of Letters Patent. Patented May 4, 1909.

Application filed August 3, 1908. Serial No. 446,667.

*To all whom it may concern:*

Be it known that we, ORAN B. BLANKENSHIP and HARRY B. SHERWOOD, citizens of the United States, residing at Kansas City, Missouri, have invented certain new and useful Improvements in Dash-Pots, of which the following is a specification.

Our invention relates to dash pots, and while we have devised the present improvement particularly for use in weighing machines or scales, we do not limit ourselves to such application of the invention.

It is the object of our invention to provide a device of simple construction which will be economical to manufacture and effective in use.

The invention consists in the features of construction and combination and arrangement of parts hereinafter described and particularly pointed out in the claims.

In the drawings—Figure 1 is a central vertical longitudinal section through a dash pot embodying our invention. Fig. 2 is a transverse sectional view on line 2—2 of Fig. 1.

In these drawings, 1 indicates the cylinder of the apparatus having a head 2 through which a stem 3 extends, said stem being adapted to be connected in any suitable manner with a moving portion of the scale or weighing apparatus, for which purpose the upper end of the stem is provided with an opening at 3ª.

The stem carries at its inner end a piston which consists of a ring shaped member 4 and a disk 5 adapted, in diameter, to fit the opening in the ring shaped member. The ring shaped member is formed with or attached to a yoke 6, the boss 7 of which is attached to the lower end of the stem. This stem is hollow and contains therein a supplemental adjustable stem 9 which, at its inner end, carries the disk before mentioned. The supplemental stem is screw threaded at its upper end, and is engaged by a nut 9 confined within a yoke 10 at the upper end of the main stem and fixed rigidly thereto. The supplemental stem is held from turning in relation to the main stem by a pin 11 passing through a slot 12 in the main stem, and this construction, while preventing the turning of the supplemental stem, allows the said stem a certain amount of movement longitudinally within the main stem.

The amount of cushioning or resistance offered to the downward movement of the piston will depend upon the position of the disk 5 of the piston in relation to the opening in the ring shaped member 4, for it will be obvious that, by adjusting the disk so as to close the opening through the ring shaped member, a maximum resistance will be afforded, while, by adjusting the disk upwardly or away from the ring shaped member, an annular opening will be provided between the inner edge of the ring shaped member and the outer edge of the disk for the passage of the oil or other cushioning fluid more or less freely, according to the extent of the adjustment which is made.

As will be understood from the above, the adjustment of the disk in relation to the ring shaped member of the piston is effected by turning the nut or knurled disk 9 on the screw threaded inner stem, and this adjusting nut is always accessible without removing or disconnecting any of the parts, as it lies above the head of the cylinder, and the adjustment of the supplemental stem, with its disk, may be made without, in any way, altering the adjustment of the main stem in relation to the operative parts of the scale.

We claim as our invention:—

1. A dash pot comprising a cylinder, a piston and a piston rod, said piston consisting of a ring shaped member and a disk adjustable axially to and from the opening in the ring shaped member, and means for adjusting the disk, to vary the annular opening between the ring and disk, substantially as described.

2. In combination in a dash pot, a cylinder, a piston and a piston rod, said piston comprising a ring shaped member, a yoke connecting the same with the piston rod or main stem, and a supplemental stem carrying a disk within the ring, with means for adjusting the supplemental stem to move the disk to and from the opening in the ring, substantially as described.

3. In combination in a dash pot, a cylinder, a piston consisting of a ring and a disk, a main stem or piston rod carrying the ring and having a yoke, a supplemental stem adjustable within the main stem and carrying the disk, said supplemental stem being screw threaded, a nut held by the yoke of the main stem and engaging the screw threaded portion of the supplemental stem, and means whereby the piston rod or stem may be connected with the operative parts of the apparatus to which the dash pot is attached, at a point above the yoke, substantially as described.

In testimony whereof, we affix our signatures in presence of two witnesses.

O. B. BLANKENSHIP.
H. B. SHERWOOD.

Witnesses:
  O. G. STAND,
  V. P. BROCKHOUSE.